March 8, 1955 H. SEELER 2,703,572
MASK AND PRESSURE SUIT COMBINATION OXYGEN REGULATOR
Filed Aug. 29, 1949 2 Sheets-Sheet 1

INVENTOR.
HENRY SEELER
BY
ATTORNEY
AGENT

March 8, 1955 H. SEELER 2,703,572
MASK AND PRESSURE SUIT COMBINATION OXYGEN REGULATOR
Filed Aug. 29, 1949 2 Sheets-Sheet 2
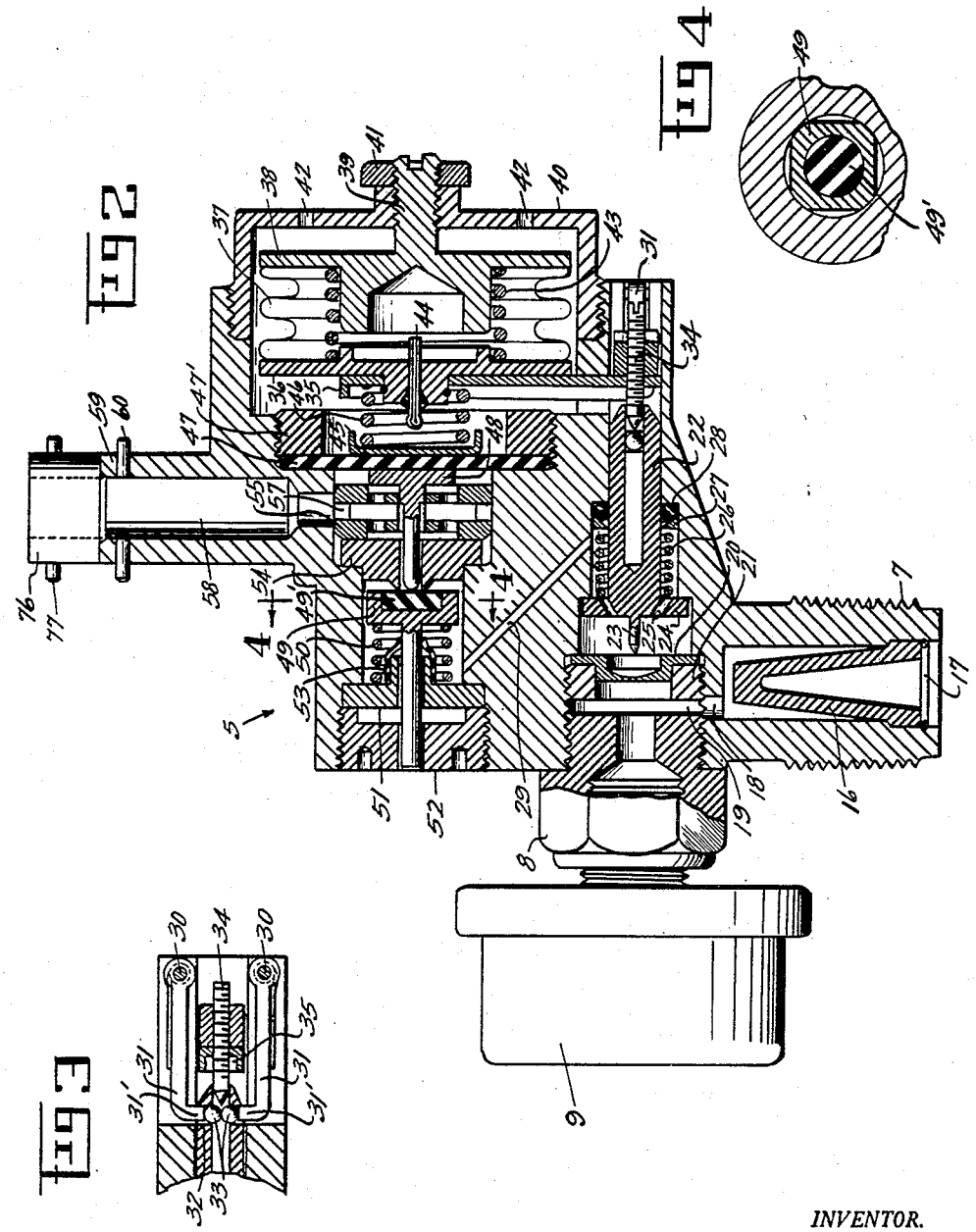
INVENTOR.
HENRY SEELER
BY Wade Koontz
ATTORNEY and
Charles L. Burgoyne
AGENT

United States Patent Office 2,703,572
Patented Mar. 8, 1955

2,703,572

MASK AND PRESSURE SUIT COMBINATION OXYGEN REGULATOR

Henry Seeler, Dayton, Ohio

Application August 29, 1949, Serial No. 113,015

8 Claims. (Cl. 128—144)

(Granted under Title 35, U. S. Code (1952), sec. 266)

The invention described herein may be manufactured and used by or for the United States Government for governmental purposes without payment to me of any royalty thereon.

The present invention relates to an oxygen regulator for use in combination with a face mask and a pressure suit, especially for high altitude flying.

The primary object of the invention is to provide a regulating device automatically energized at a predetermined altitude to supply high pressure oxygen to an inflatable pressure suit and supply oxygen under moderate pressure to a face mask.

A further object of the invention is to provide an oxygen regulator for association with an inflatable pressure suit and a face mask and including a seal puncturing device actuated by an aneroid controlled means to puncture a sealing disk at a predetermined altitude to release oxygen under pressure for flow into the regulator and for controlled flow therefrom to the pressure suit and to the face mask.

Another object of the invention is to provide an oxygen regulator for association with an inflatable pressure suit and a face mask and including a pressure reducing valve effective to reduce the pressure of the oxygen supplied to the face mask to a fraction of that supplied to the pressure suit.

Another object of the invention is to provide an oxygen regulator for association with an inflatable pressure suit and a face mask and including aneroid means responsive to a predetermined altitude to release a supply of oxygen under pressure for flow into the regulator and also actuate an oxygen flow control valve to permit oxygen flow into the pressure suit and into an auxiliary control device for governing oxygen flow to the face mask at a reduced pressure bearing a fixed ratio with respect to the pressure applied to the pressure suit.

Another object of the invention is to provide an oxygen regulator for association with a face mask including an improved and simplified pressure reducing valve for supplying oxygen to the face mask in controlled quantities at permissible pressures.

The above and other objects of the invention will become apparent upon reading the following detailed description in conjunction with the accompanying drawings, in which:

Fig. 2 is a longitudinal cross sectional view of the regulator taken on line 2—2 of Fig. 1.

Fig. 3 is a cross sectional view of a latching device to maintain the copper sealing disk puncturing plunger in retracted position.

Fig. 4 is a cross sectional view taken on line 4—4 of Fig. 2.

Figure 1:
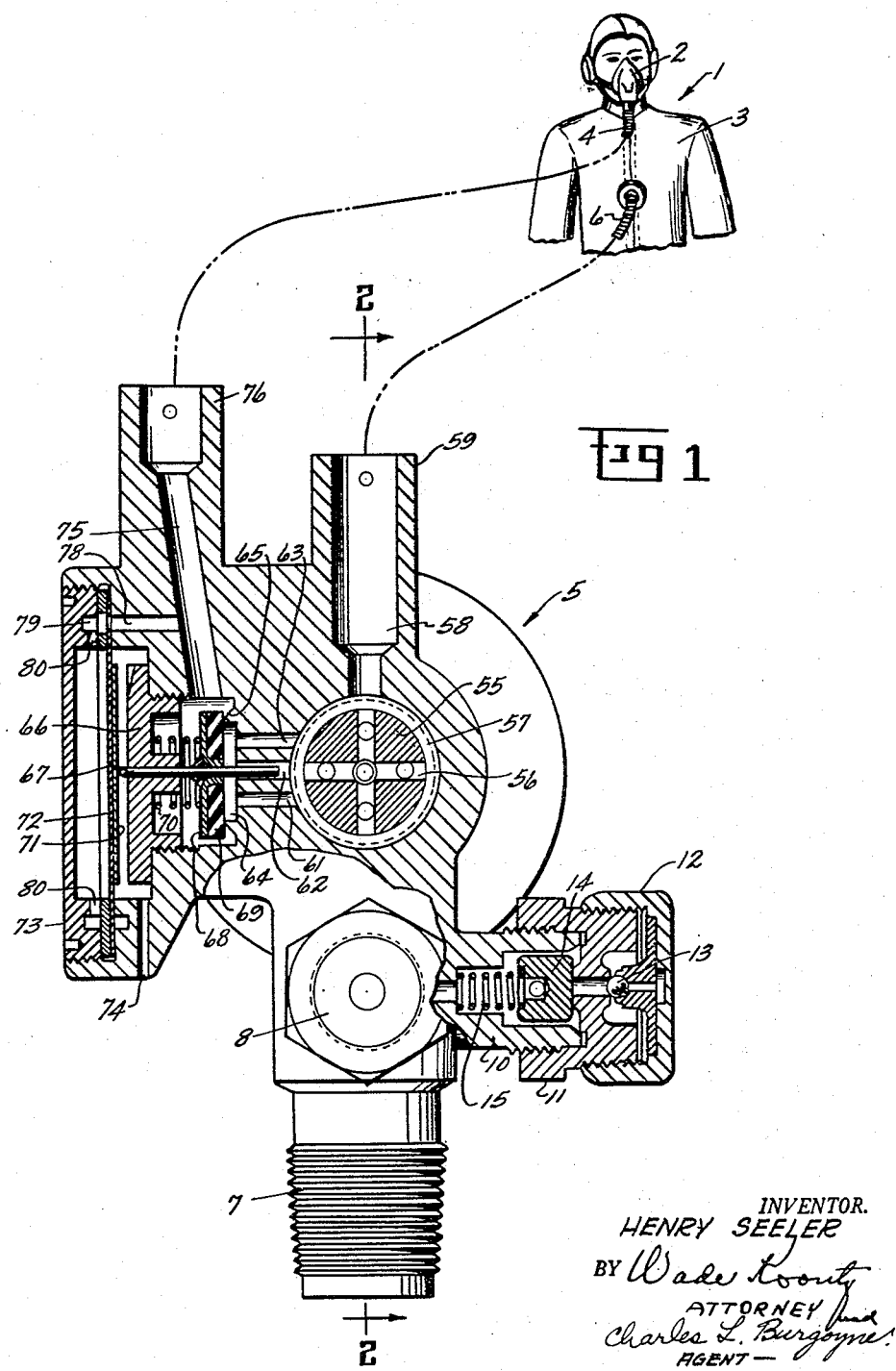
Fig. 1 is a combined schematic and cross sectional view showing the mask and suit connections to the regulator, and showing a transverse section of the regulator on an enlarged scale.

The present oxygen regulator combines the functions of supplying oxygen for a face mask and gaseous pressure for a pressurizing suit worn by a high altitude flyer. It may be used in flying a non-pressurized aircraft or in flying a pressurized aircraft wherein there is danger of the cabin pressurizing equipment failing or danger of sudden rupture of the cabin wall. The regulator includes automatic oxygen release means to start the flow of oxygen immediately upon reduction of cabin pressure to a predetermined minimum value. There is also included a pressure reducing valve to bring about oxygen flow to the face mask at a pressure which is a predetermined fraction of the gas pressure applied to the pressure suit. The details of the face mask and the pressure suit may vary considerably and accordingly it should be emphasized that the present regulator may find equal utility in combination with many types of masks and suits. The mask should normally include an exhalation or outlet valve responsive to increased mask pressure upon exhalation to open and allow expulsion of respiration products. The pressure suit will usually include a gas receiving bladder or space to cause application of pressure to certain expansible portions of the human body, such as the abdomen and the thorax. At this point reference is made to Fig. 1 which shows an aviator 1 equipped with a face mask 2 and a pressure suit 3. At 4 an oxygen conduit leads to the face mask from the regulator 5 and at 6 an oxygen conduit leads to the pressure suit from the regulator. The regulator includes a threaded fitting 7 for connection to an oxygen bottle or oxygen supply main. If desired the oxygen bottle or container may be of the small capacity type suitable for carrying by the aviator if and when he bails out of the aircraft during an emergency at high altitude, such as 40,000 feet or more above sea level.

At 8 in Fig. 1 is indicated a threaded opening to receive a pressure gage 9 (see Fig. 2) for indicating the available oxygen pressure at fitting 7. Adjacent to the gage connection is a nipple 10 having mounted thereover an apertured cap 11 which is in turn closed by a cap 12 and ball 13. Inside the fitting 10 is a check valve member 14 spring projected to closing position by a spring 15. When it is time to refill the oxygen container secured on fitting 7, it is merely necessary to remove the outer cap 12 and connect a source of high pressure oxygen to the outer end of the apertured cap 11. Then the oxygen will flow past the check valve 14 and by way of fitting 7 reach the oxygen container. When sufficient pressure is built up in the container this will show on the gage 9 and the replenishing oxygen supply may be disconnected and the cap 12 replaced and tightened securely. As shown in Fig. 2 the fitting 7 is provided on the interior with a filter element 16 which in usual practice is made of powdered metal and may be made in accordance with the principles set out in U. S. Patent No. 2,297,817 granted to Clyde W. Truxell et al. on October 6, 1942. The filter, which removes dust and foreign objects from the flowing oxygen, may be held in place by a snap ring 17.

The interior of the fitting 7 communicates by a passage 18 with an adjacent chamber 19 closed at one end by a copper sealing disk 20 held in place by a threaded ring 21. Thus the oxygen under pressure, 1800 pounds for instance, cannot flow to the right to reach the regulator as long as the disk 20 is intact. The chamber 19 narrows down on the downstream side of disk 20 and slidably mounted therein is a plunger 22 having a piercing point 23 thereon. Behind the point or pin 23 the plunger 22 is diametrally enlarged as at 24 and provided therethrough are holes 25 to permit flow of oxygen after the disk 20 is punctured. Behind the portion 24 of the plunger there is a compression spring 26, an abutment washer 27 and a rubber sealing ring or O-ring 28 to prevent high pressure oxygen from reaching the aneroid chamber to be described below. It will be noted that the rearward side of washer 27 is beveled in such a manner as to exert a constant camming or compressing action on the rubber ring 28 tending to force it tightly into engagement with the plunger 22 and the rear end of the chamber 19. Oxygen flow from the latter chamber is by way of a sloping lateral passage 29.

The plunger 22 is normally held in the retracted position shown by means of a multiple latch illustrated more particularly in Fig. 3. Pivoted in the body of the regulator at 30 is a pair of swinging spring-projected latch members 31 having end portions 31' directed toward each other and adapted to engage in opposite recesses 32 in the rear end of plunger 22. Between the end portions 31' is a pair of ball elements 33 normally in contacting relation but adapted to be forced apart by a pointed latch releaser 34 adjustably secured to a laterally extending arm 35 rigidly connected to the end plate 36 of aneroid bellows 37. At the other end of bellows 37 is a second end plate 38 having a central threaded projection 39 thereon adjustable with respect to the end cover member 40 and locked in place by a lock nut 41 after being properly adjusted. The aneroid chamber closed by cover member 40 is open to the atmosphere within the aircraft by way of apertures 42. The laterally extending arm 35 is of channeled form to provide a light weight and rigid member. As will be seen the aneroid may upon expansion carry the arm 35 and latch releaser 34 to the left far enough to cause the latch members 31 to disengage the plunger 22, whereby the plunger will then move instantly to the left and puncture the seal 20. The oxygen under pressure will then push the piercing pin 23 back out of the punctured seal sufficiently to allow flow of oxygen through chamber 19 and thence through the passage 29.

Noting again the aneroid 37 it is seen that the bellows encloses a compression spring 43 which makes the metal bellows more responsive to pressure changes. Also the bellows is evacuated before use by means of the tube 44 which is sealed off at the outer end when a sufficient degree of vacuum has been developed in the bellows. The evacuated bellows is compressed a maximum amount at sea level or below sea level but as the altitude increases the bellows expands in response to the reduced barometric pressure. It should be understood that the regulator is generally carried in a pressurized aircraft and if all goes well the regulator is not used because the pressure maintained in the aircraft is sufficient to prevent actuation of the spring plunger 22. However if the cabin pressure is suddenly lost at high altitude, then the aneroid bellows 37 will expand and cause the seal 20 to be pierced or broken thus allowing oxygen to flow into the regulator and also to the emergency mask and pressure suit.

Extending between the arm 35 and the cupped disk 45 is a compression spring 46 adapted to be compressed by the expanding bellows 37 and place greater pressure on the flexible diaphragm 47 held in place by the threaded retaining ring 47'. The diaphragm in turn acts on a push pin 48 contacting a poppet valve 49 biased toward closing position by means of a spring 50. The outwardly extending free end of poppet valve 49 is guided in a disk 51 held in place by a threaded plug 52 and the valve member carries a rubber sealing band 53 extending over a tubular extension of disk 51. The band 53 is adapted to flex freely so that the poppet stem need not slide with respect to the rubber band 53. The valve seat member 54 cooperating with the poppet valve 49 is held in position by a threaded member 55 having radial passages 56 therein which extend into an annular recess 57 (see Fig. 1). This recess communicates directly with the passage 58 leading to the pressure suit. The upper end of the passage 58 ends in a fitting 59 including transverse pins 60 for retaining a coupling sleeve securely thereon. As seen in Fig. 4 the poppet valve 49 has four flattened wide portions where it is slidably mounted in the valve chamber and this will permit oxygen to pass around the sides of the enlarged head portion of the valve member. The valve member includes an insert 49' of hard rubber, fiber or plastic to give an improved seating action. The stem portion of valve member 49 is preferably made of a diameter just equal to the passage through the valve seat member 54, so that the oxygen pressure in the valve chamber does not have any direct action on the poppet valve tending to either close or open the valve.

The poppet valve 49 functions to control the supply of oxygen reaching the pressure suit and the face mask and primarily accomplishes a substantial pressure reduction. This pressure reducing effect is brought about by the balancing action of the diaphragm 47 and the aneroid controlled spring 46. The spring 50, which normally maintains the valve 49 closed and gives a constant closing force thereon, is soft in its action and exerts little control over the pressure reducing action of valve 49. The amount of pressure reduction obtained by valve 49 may vary but in one embodiment of the invention the valve was designed to give an outlet pressure of about 15 pounds per square inch where the pressure of the oxygen gage 9 was 1800 pounds. This outlet pressure exerted over the diaphragm 47 provides a force which counterbalances the force of spring 46 to maintain the valve 49 in a more or less stable open position. Also it is noted that the spring 46 is under very little compression until the aneroid bellows 37 is expanded to some extent from the retracted position shown in Fig. 2. The degree of expansion of the bellows 37 will determine the relative compression of spring 46 and the amount of opening at valve 49. Thus as the altitude increases there will be some tendency to increase the valve outlet pressure, but the tendency is largely counteracted by the increase in the opposing force exerted by the diaphragm 47 having the outlet pressure exerted over its free area. The reducing valve or primary control valve 49 gives the only pressure reduction required for the pressure suit but provides only the first stage of pressure reduction as far as the face mask is concerned.

For a description of the mask oxygen supply and pressure regulator reference is now made to Fig. 1, wherein it will be seen that the regulator for the mask oxygen flow extends at a right angle to the primary regulator shown in Fig. 2. The oxygen at reduced pressure reaching the annular recess 57 in member 55 is free to flow laterally through the passages 61, 62 and 63 into the circular recess or oxygen inlet chamber 64 inside the valve seat 65. The valve seat 65 is at the inner end of a recess having its outer end closed by a flanged disk or plug 66. Passing centrally through the plug 66 and freely slidable therethrough is a valve stem 67 having an intermediate portion fastened to the valve member 68. The valve member 68 has a soft rubber facing 69 providing a valve in cooperation with valve seat 65. Extending between the plug 66 and the valve member 68 is a very light compression spring 70, which is not essential to the proper operation of the regulator but may be used for its stabilizing or damping effect on the movable valve element. The outer end of the valve stem is rounded slightly and contacts the thin plate 71 adhered to a flexible diaphragm 72 having a relatively large diameter. The diaphragm is clamped in place as shown by a threaded cover plate 73 hollowed out to provide a pressure chamber or valve control chamber at the outer side of the diaphragm. The inner side of the diaphragm communicates with the atmosphere by way of passage 74. The chamber between plug 66 and valve member 68 receives oxygen when the valve member leaves the associated valve seat 65 and this oxygen is free to flow up the passage 75 and through the fitting 76 to the face mask. The fitting 76 includes pins 77 to retain a connecting sleeve in place thereon. Extending laterally from the passage 75 is a passage 78 in register with openings in the diaphragm and associated gasket, whereby the pressure in the valve chamber is communicated to the annular passage 79 in cover plate 73 and thence to the outer side of the valve controlling diaphragm by way of passages 80. The pressure on the inner side of the diaphragm 72 is almost negligible, since it is always atmospheric and by comparison with the pressure in the valve chamber and on the outer side of the diaphragm is quite low. Thus the action of the combined supply valve and pressure reducing valve 68, 69 is determined by the relative balance or unbalance between the pressure acting in recess 64 on the valve 68, 69 and the pressure acting on the outer side of diaphragm 72. For example if it is empirically determined that the pressure on the diaphragm should be one-fifth of that in the recess 64, then the active area of the diaphragm 72 is made five times that of the valve seating area of valve 68, 69. The valve seating area is that area enclosed by the valve seat 65 and facing toward the recess 64. The active area of the diaphragm is not the entire free area thereof, since the marginal edges close to the regulator body and are not free to expand to the same extent as the central portions of the diaphragm. For this reason the active area is estimated by taking a mean area midway between the outer edge of the plate 71 and the outer edge of the diaphragm 72. The valve stem or rod 67 extending from the valve member 68 to the diaphragm 72 may be termed a force transmitting means or a thrust transmitting means.

The ratio of pressures chosen for the above example seems to be very satisfactory in the present regulator, wherein the available oxygen pressure at the bottle, and showing on gage 9, does not exceed 1800 pounds per square inch and the pressure reduction at valve 49 is about 100 to 1. Of course maximum available pressure is gradually reduced as the oxygen is consumed and furthermore there is a substantial pressure reduction through the aneroid actuated valve 49. Assuming the aviator to be inhaling or exhaling at all times, the pressure on diaphragm 72 will always be below or above the theoretical valve balancing pressure at all times and the valve 68, 69 will always be open or closed at all times. Actually there will be intermediate periods of short duration when the aviator is neither inhaling nor exhaling and the opposing thrusts on the valve 68, 69 will come into balance. At these times the valve will tend to stay closed because of the fact that any appreciable opening thereof will build up pressure on the outer side of the control diaphragm 72 and also the soft coil spring 70 will further tend to close the valve when the gas pressure forces are in approximate balance. At such times the forces acting on the valve may be equated as follows:

$$A \times P = 5A \times P/5$$

In this equation the quantities on the left of the equality sign represent the area and pressure on the valve 68, 69, while the quantities on the right of the equality sign represent the area and pressure on the outer side of diaphragm 72. During the breathing cycle this balanced relation is upset, since inhalation temporarily reduces the pressure on the diaphragm below the value of $P/5$, while exhalation temporarily increases the pressure on the diaphragm above the value of $P/5$. Since the diaphragm area is constant, these pressure variations below and above the valve balancing pressure will cause opening and closing of the combined supply and pressure reducing valve 68, 69. As long as the subject continues to inhale, the incoming oxygen will not appreciably increase the pressure on diaphragm 72 and the valve 68, 69 will continue to say open. However as soon as inhalation stops the valve will tend to close and as soon as exhalation starts the increase of pressure on the diaphragm 72 above the value of $P/5$ will immediately close the valve 68, 69 very positively. Expulsion of the products of respiration is made by way of an automatic spring-loaded check valve carried on the mask wall. Such valve opens only when the subject exhales and causes the valve to be forced from its seat by the sudden increase in mask pressure.

The operation of the combination oxygen regulator will now be summarized briefly. High pressure oxygen available on the upstream side of the copper sealing disk 20 remains in readiness until such time as there is very low atmospheric pressure around the regulator, and the response pressure may be regulated by proper endwise adjustment of the end plate 38 of the aneroid bellows 37. When the pressure on the bellows is reduced to a level where the aviator should receive oxygen and should have his pressure suit inflated, the expansion of the bellows will be such that the latch releaser 34 will have forced the balls 33 apart and will have released the latch members 31 from the plunger 22. The plunger 22 now moves to the left under the influence of spring 26 and the point 23 pierces the sealing disk 20. The pressure of the available oxygen now pushes the plunger 22 back sufficiently to permit a steady flow of oxygen into the regulator body and by way of the passages 25 and 29 into the primary oxygen supply valve chamber. The primary oxygen supply valve or primary pressure reducing valve 49 has already been forced off the associated valve seat by the push rod 48, acted on by the diaphragm 47 and the aneroid controlled spring 46. Oxygen under reduced pressure is now free to flow past valve 49 through the passages in plug 55 and by the passage 58 into the tube leading to the pressure suit 3. The suit is soon inflated and requires very little additional oxygen thereafter.

The oxygen reduced in pressure also may flow into passages 61, 62 and 63 to reach a circular recess 64 on one side of a poppet valve 68, 69. When the aviator breathes in, the pressure between the cap 73 and diaphragm 72 is reduced to such an extent that the valve 68, 69 moves off the seat 65 due to an unbalancing of thrust forces on the valve. Continued inhalation maintains the secondary supply valve or secondary pressure reducing valve 68, 69 open but due to the large area of the control diaphragm 72 as compared with that of the valve 68, 69, the pressure in the tube leading to the face mask will be maintained at a fraction of the suit pressure or in the example stated about 3 pounds per square inch. The secondary oxygen supply valve 68, 69 will effectively regulate the mask pressure down to a fraction of the suit pressure or the pressure available at the recess 64. The value of the fraction referred to may be carefully predetermined by proper relation between the areas of the valve and the diaphragm. Thus if the fraction is chosen as one-fifth for example, then the active area of valve 68, 69 inside seat 65 will be made one-fifth of the active area of diaphragm 72 under the cap member 73. When the aviator exhales the pressure between the cap 73 and diaphragm 72 is increased to such an extent that the valve 68, 69 is closed, because the pressure exerted by the diaphragm on valve stem 67 will exceed the pressure exerted by the valve itself exposed to high pressure oxygen in recess 64. Since the diaphragm controlled poppet valve 68, 69 responds to inhalation by opening to feed oxygen to the face mask 2 and responds to exhalation by closing to stop oxygen flow to the face mask, the present invention includes what may be termed a pressure actuated oxygen demand regulator. According to the principles of construction outlined above the present demand regulator provides for simultaneous oxygen pressure reduction, so that excessive oxygen pressure will not develop in the face mask at any time. Such excessive pressure is objectionable because it tends to produce unnatural breathing conditions, which are apt to result in confusion and fatigue.

The embodiment of the invention herein shown and described is to be regarded as illustrative only and it is to be understood that the invention is susceptible of variations, modifications and changes within the scope of the appended claims.

I claim:

1. In combination with an aviator's face mask and inflatable pressure suit, an oxygen regulator comprising a regulator body including an oxygen inlet chamber therein, flow blocking means in said chamber to prevent flow of oxygen therethrough, an aneroid bellows in said body, means actuated by expansion of said bellows at a predetermined atmospheric pressure to open said flow blocking means, a primary pressure reducing valve in said body, means to conduct oxygen flowing past said primary pressure reducing valve to said inflatable pressure suit, a secondary pressure reducing valve in said body, means to conduct oxygen flowing past said primary pressure reducing valve to said secondary pressure reducing valve, and means to conduct oxygen flowing past said secondary pressure reducing valve to said face mask.

2. In combination with an aviator's face mask and inflatable pressure suit, an oxygen regulator comprising a regulator body including an oxygen inlet chamber therein, flow blocking means in said chamber to prevent flow of oxygen therethrough, an aneroid bellows in said body, means actuated by expansion of said bellows at a predetermined atmospheric pressure to open said flow blocking means, a movable valve member mounted in said body to regulate the flow of oxygen from said oxygen inlet chamber and reduce the pressure thereof, a control diaphragm for said movable valve member having one side exposed to the oxygen at reduced pressure flowing past said movable valve member, compression spring means acting on the other side of said diaphragm and adapted to be compressed by expansion of said bellows, a push rod extending from said one side of said diaphragm to said movable valve member to control the amount of opening thereof, means to conduct oxygen flowing past said movable valve member to said inflatable pressure suit, a secondary pressure reducing valve in said body, means to conduct oxygen flowing past said movable valve member to said secondary pressure reducing valve, and means to conduct oxygen flowing past said secondary pressure reducing valve to said face mask.

3. In combination with an aviator's face mask and inflatable pressure suit, an oxygen regulator comprising a regulator body including an oxygen inlet chamber therein, an aneroid bellows in said body adapted to expand at low atmospheric pressures, a movable valve member mounted in said body to regulate the flow of oxygen from said oxygen inlet chamber and reduce the pressure thereof, a control diaphragm for said movable valve member having one side exposed to the oxygen at reduced pressure flowing past said movable valve member, compression spring means acting on the other side of said diaphragm and adapted to be compressed by expansion of said bellows, a push rod extending from said one side of said diaphragm to said movable valve member to control the amount of opening thereof, means to conduct oxygen flowing past said movable valve member to said inflatable pressure suit, a secondary pressure reducing valve in said body, means to conduct oxygen flowing past said movable valve member to said secondary pressure reducing valve, and means to conduct oxygen flowing past said secondary pressure reducing valve to said face mask.

4. In combination with an aviator's face mask and inflatable pressure suit, an oxygen regulator comprising a regulator body including an oxygen inlet chamber therein, a seal extending across said chamber to prevent oxygen flow therethrough, an aneroid bellows in said body, a spring-projected plunger actuated by expansion of said bellows at a predetermined atmospheric pressure to pierce said seal, a primary oxygen supply valve in said body adapted to regulate the flow of oxygen through said regulator and reduce the pressure thereof after said seal is pierced, means to conduct oxygen flowing past said primary oxygen supply valve to said inflatable pressure suit and to a secondary oxygen supply valve chamber, a movably mounted secondary valve member exposed on one side to the suit pressure, a valve controlling diaphragm having an area larger than that of said valve member exposed on one side to the pressure on the other side of said valve member, force transmitting means extending from said diaphragm to said valve member whereby the force exerted on said one side of said diaphragm opposes the force exerted on said one side of said valve member, and means for conducting oxygen passing from said one side of said valve member to said other side of said valve member directly to said face mask.

5. In an oxygen demand regulator for operative association with an aviator's face mask, a slidably mounted poppet valve member, a valve seat for said poppet valve member, means to conduct oxygen under high pressure to the side of said valve member which contacts said valve seat, means providing a poppet valve chamber housing said poppet valve member and receiving said oxygen only when said poppet valve is open, a valve controlling diaphragm mounted in a separate diaphragm chamber, means providing a conduit from said poppet valve chamber to said face mask and to a space at one side of said diaphragm, and thrust transmitting means extending from said diaphragm at the other side thereof to said poppet valve member whereby the force exerted on said one side of said diaphragm by oxygen pressure in said space opposes the force exerted on said poppet valve member by said high pressure oxygen at the side thereof which contacts said valve seat.

6. In an oxygen demand regulator for operative association with an aviator's face mask, a slidably mounted poppet valve member, a valve seat for said poppet valve member, means to conduct oxygen under high pressure to the side of said valve member which contacts said valve seat, means providing a poppet valve chamber housing said poppet valve member and receiving said oxygen only when said poppet valve is open, a valve controlling diaphragm having an area larger than the enclosed area of said valve member within said valve seat and mounted in a separate diaphragm, means providing a conduit from said poppet valve chamber to said face mask and to a space at one side of said diaphragm, and a force transmitting rod rigidly connected to said valve member and having one end in contact with the other side of said diaphragm whereby the force exerted on said one side of said diaphragm by oxygen pressure in said space opposes the force exerted on said poppet valve member by said high pressure oxygen at the side thereof which contacts said valve seat.

7. In an oxygen demand regulator for operative association with an aviator's face mask, a slidably mounted poppet valve member, a valve seat for said poppet valve member, means to conduct oxygen under high pressure to the side of said valve member which contacts said valve seat, means providing a poppet valve chamber housing said poppet valve member and receiving said oxygen only when said poppet valve is open, a valve controlling diaphragm having an area larger than the enclosed area of said valve member within said valve seat and mounted in a separate diaphragm chamber, means providing a conduit from said poppet valve chamber to said face mask and to a space at one side of said diaphragm, means providing a conduit from the surrounding atmosphere to a space at the other side of said diaphragm, and a force transmitting rod rigidly connected to said valve member and having one end in contact with said other side of said diaphragm centrally thereof, whereby the force exerted on said one side of said diaphragm by oxygen pressure in said space opposes the force exerted on said poppet valve member by said high pressure oxygen at the side thereof which contacts said valve seat, and whereby said mask is supplied with oxygen reduced in pressure to a fraction of the high pressure oxygen, which fraction is approximately equal to the enclosed area of said valve member divided by the area of said diaphragm at said one side thereof.

8. In an oxygen demand regulator for operative association with an aviator's face mask, a movably mounted poppet valve member, a circular valve seat for said poppet valve member providing an oxygen inlet chamber within the confines of said seat and at the side of said poppet valve member which contacts said valve seat, means to conduct oxygen under high pressure to said oxygen inlet chamber, means providing a poppet valve chamber for housing said poppet valve member and receiving oxygen only when said poppet valve member is spaced from said valve seat, means providing a valve control chamber adjacent to but separate from said poppet valve chamber, diaphragm means forming one wall portion of said valve control chamber and having an area greater than that of said poppet valve member within the confines of said valve seat, means providing a conduit from said poppet valve chamber to said face mask and to said valve control chamber, and thrust transmitting means extending from said diaphragm means at the side thereof remote from said valve control chamber to said poppet valve member, whereby the force exerted on said diaphragm means by oxygen pressure in said valve control chamber opposes the force exerted on said poppet valve member by said high pressure oxygen reaching said oxygen inlet chamber, and whereby said mask is supplied with oxygen reduced in pressure to a fraction of the high pressure oxygen, which fraction is approximately equal to the area of said poppet valve member within the confines of said valve seat divided by the area of said diaphragm means.

References Cited in the file of this patent

UNITED STATES PATENTS

| | | |
|---|---|---|
| 2,390,233 | Akerman et al. | Dec. 4, 1945 |
| 2,418,034 | Kizaur | Mar. 25, 1947 |

FOREIGN PATENTS

| | | |
|---|---|---|
| 478,412 | Great Britain | Jan. 18, 1938 |